US008612647B2

(12) United States Patent
Kootstra et al.

(10) Patent No.: US 8,612,647 B2
(45) Date of Patent: Dec. 17, 2013

(54) PRIORITY AWARE QUEUE

(75) Inventors: Lewis S. Kootstra, Roseville, CA (US); Jonathan M. Watts, Folsom, CA (US)

(73) Assignee: Hewlett—Packard Development Company, L.P., Houston, TX (US)

( * ) Notice: Subject to any disclaimer, the term of this patent is extended or adjusted under 35 U.S.C. 154(b) by 2134 days.

(21) Appl. No.: 11/103,966

(22) Filed: Apr. 12, 2005

(65) Prior Publication Data
US 2006/0230195 A1   Oct. 12, 2006

(51) Int. Cl.
*G06F 13/38* (2006.01)

(52) U.S. Cl.
USPC .............................................. 710/52; 710/29

(58) Field of Classification Search
USPC .............. 710/39, 54; 370/229, 230, 235, 412, 370/231, 466; 369/32.01; 725/115; 707/101
See application file for complete search history.

(56) References Cited

U.S. PATENT DOCUMENTS

| | | | |
|---|---|---|---|
| 4,933,901 A | 6/1990 | Tai et al. | |
| 5,140,584 A * | 8/1992 | Suzuki | 370/235 |
| 5,313,454 A * | 5/1994 | Bustini et al. | 370/231 |
| 5,610,841 A * | 3/1997 | Tanaka et al. | 725/115 |
| 5,903,776 A | 5/1999 | Larson | |
| 6,173,378 B1 | 1/2001 | Rozario et al. | |
| 6,523,098 B1 | 2/2003 | Anderson | |
| 6,647,016 B1 * | 11/2003 | Isoda et al. | 370/412 |
| 6,661,802 B1 * | 12/2003 | Homberg et al. | 370/412 |
| 6,721,273 B1 * | 4/2004 | Lyon | 370/235 |
| 6,920,109 B2 * | 7/2005 | Yazaki et al. | 370/230.1 |
| 6,925,055 B1 * | 8/2005 | Erimli et al. | 370/229 |
| 6,931,025 B1 * | 8/2005 | Masuda | 370/466 |
| 6,976,154 B1 * | 12/2005 | Dyckerhoff et al. | 712/220 |
| 7,002,980 B1 * | 2/2006 | Brewer et al. | 370/414 |
| 7,061,862 B2 * | 6/2006 | Horiguchi et al. | 370/230 |
| 7,420,917 B2 * | 9/2008 | Ishikawa et al. | 370/232 |
| 7,525,912 B2 * | 4/2009 | Yazaki et al. | 370/230.1 |
| 2003/0081624 A1 * | 5/2003 | Aggarwal et al. | 370/412 |
| 2003/0128712 A1 * | 7/2003 | Moriwaki et al. | 370/412 |
| 2004/0095885 A1 * | 5/2004 | Yang | 370/235.1 |
| 2004/0125815 A1 * | 7/2004 | Shimazu et al. | 370/411 |
| 2005/0036502 A1 * | 2/2005 | Blanc et al. | 370/412 |
| 2006/0221781 A1 * | 10/2006 | Suzuki | 369/32.01 |

OTHER PUBLICATIONS

Main, Data Structure and Other Objects Using Java, 1999, Addison Wesley, pp. vii, 325-329, 347, 363-366.*
Wikipedia, Leaky Bucket, http://en.wikipedia/wiki/Leaky_bucket, retrieved Oct. 2009, pp. 1-3.*
Wikipedia, Token Bucket, http://en.wikipedia.org/wiki/Token_bucket, retrieved Oct. 2009, pp. 1-3.*

* cited by examiner

*Primary Examiner* — Cheng-Yuan Tseng

(57) ABSTRACT

Devices, systems, and methods are provided involving queue management. One embodiment includes a computing device having a priority aware queue. In this embodiment, the device includes a queue having a number of counters associated therewith to monitor a number of items each having a classification level associated therewith. The device also includes computer executable instructions to review each of the number of counters to determine whether to discard the item based upon whether at least one of the counters indicates that a higher classification item is being held in the queue.

22 Claims, 3 Drawing Sheets

| | 330 PRIORITY LEVEL | 332 NUMBER OF ITEMS OF THIS PRIORITY | 334 ITEMS HAVING THIS PRIORITY PRESENT | 336 CAPACITY ITEMS/AVAILABLE SPACE |
|---|---|---|---|---|
| 338 → | HIGHEST 7  316-N | 3 | 1 | 21/25 |
| | 6 | 0 | 0 | |
| | 5 | 10 | 1 | |
| | 4 | 2 | 1 | |
| | 3 | 5 | 1 | |
| | 2 | 1 | 1 | |
| | 1 | 0 | 0 | |
| 340 → | LOWEST 0  316-1 | 0 | 0 | |

*Fig. 3*

PRIORITY AWARE QUEUE

BACKGROUND

Internal to many computing devices (e.g., networking devices and/or components such as switches, routers, etc.) there is often one or more queues responsible for holding items, such as packets of information, and other types of information that are used in the computing device's global operation. A queue is used during the routing of information when a destination to which the information is to be routed is busy processing other information. For example, queues are used to hold information, such as computer executable instructions and/or data, waiting to be processed by a processor. Queues are also used to hold information waiting to be routed to and/or from a network conduit port provided on a computing device.

Typically, these queues use a First-In-First-Out (FIFO) structure for the processing of the information as it is being routed. A FIFO routes each item in the order in which it was received, so the first item in is the first item out. However, such logic structures associated with routing such items often do not provide proper throughput for timely processing of higher priority items. In such cases, a high priority item may, for example, be waiting while a number of lower priority items are being routed and thereby, the time period of action on the item may have passed.

BRIEF DESCRIPTION OF THE DRAWINGS

FIG. 3 illustrates an example of information that can be provided by a counter structure of an embodiment of the present invention.

DETAILED DESCRIPTION

Embodiments of the present invention provide a queue structure for routing of information, such as to and from a processor responsible for processing the information, or other such sources and destinations in a computing device's operation. Embodiments of the present invention allow for management of the processing of the items based upon item priority.

For example, a computing device can include a routing path for exchanging a number of items each having a priority level associated therewith. The routing path can have a queue structure having a number of counters associated therewith to monitor a number of items.

A logic component can also be associated with the routing path to review each of the number of counters to determine whether to discard the item. The logic component can include computer executable instructions written in software or firmware code and/or instructions provided by hardware, such as with a number of logic gates in an application specific integrated circuit (ASIC), a state component, or other such hardware based logic component or device. Accordingly, logic components can include computer readable media having processors and memory and/or state machines for providing one or more discard processes, such as those exemplary embodiments discussed herein.

In some embodiments, the determination of whether or not to discard an item can be based upon whether at least one of the counters indicates that a higher priority item is being held in a queue. In such an embodiment, if a higher priority item is being held in a queue, then the item being considered for discard is discarded. The discard determination process can then be applied to another item. Such an evaluation can be made before an item enters a queue and/or can be made when an item exits a queue, for example. In various embodiments, the discard process can be a part of the queuing structure or can be a part of the routing path structure.

Figure 1:
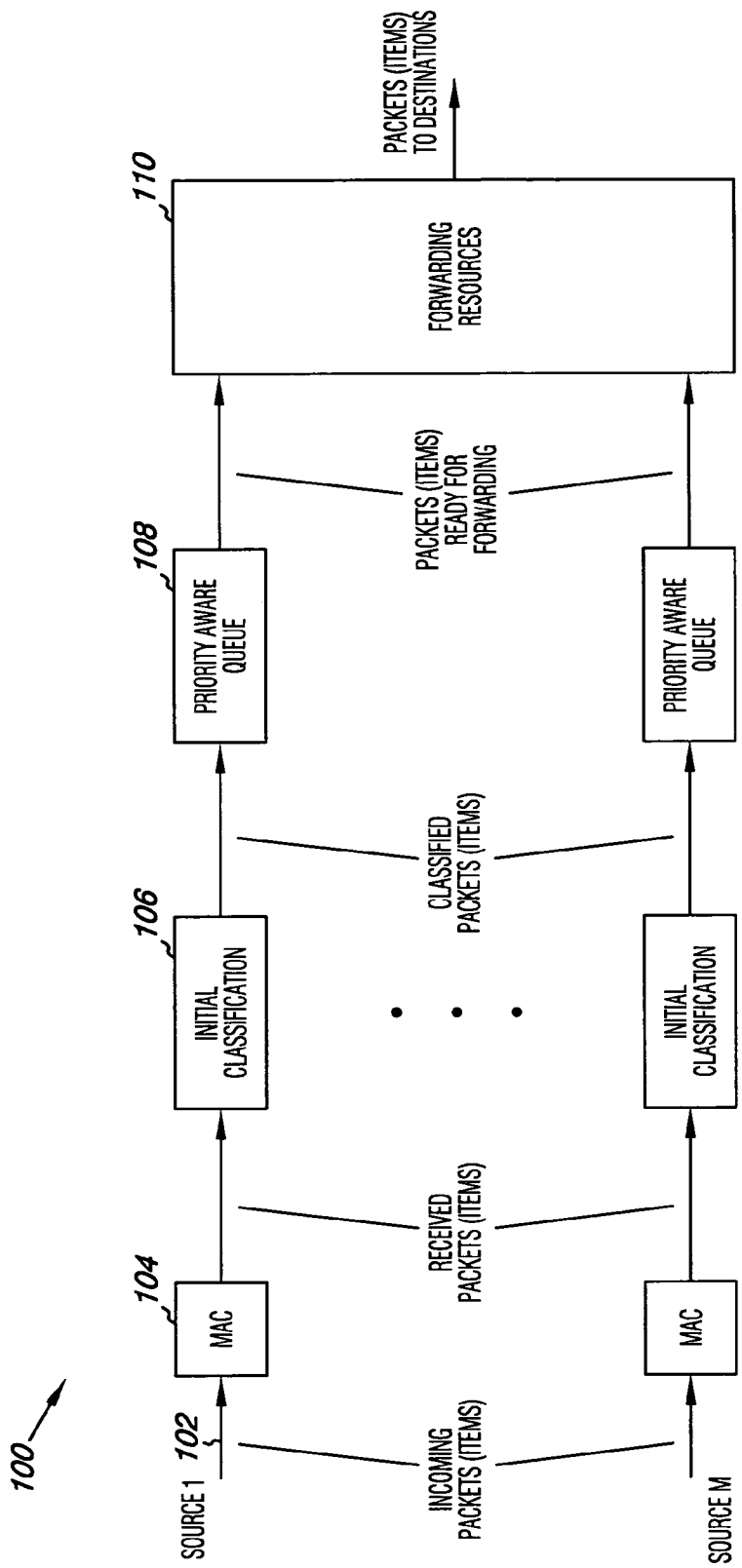
FIG. 1 is an embodiment illustrating a number of information processing paths within a networking device.

FIG. 1 is an embodiment illustrating a number of item processing paths within a networking device. In this embodiment, a networking device 100 receives incoming items 102 (e.g., in this example packets) from a number of sources (e.g., source 1 and source M, in this example). The incoming packets are routed to a Media Access Controller (MAC) 104 which can be used to receive and route the packets to an initial classifier 106 where each packet is classified.

In such embodiments, the classification process can include a number of different types of information that can be determined about the packet. For example, the type of subject matter of the packet can be determined (e.g., whether the packet is a: Transmission Control Protocol (TCP) packet, web traffic packet, File Transfer Protocol (FTP) packet, Internet Protocol (IP) Telephony packet, etc.). This information can be used to assign a level of priority for the packet.

For example, since TCP is a protocol format that is generally more tolerant of item loss, a TCP item can be discarded and resent at a later time. IP Telephony items, on the other hand, are typically short bursts of information and tend to be less loss tolerant (i.e., not usually resendable).

Therefore, discarding IP Telephony items can be less desirable than discarding TCP items, in this example. When classifying the items and assigning a priority to each item type, an IP Telephony item can be assigned a higher priority than a TCP item. The assignment of a priority can be used to indicate a preference with respect to which items to discard. This priority concept can be useful where a number of items are waiting to be acted upon in a queue structure. In such embodiments, various suitable numbers of priority levels can be used.

The priority information can be provided at various times during the processing of an item, can be provided in various forms with respect to the item being routed, and can come in various formats. For example, the priority information can be provided during the initial classification process, or at some other point in the routing process.

Additionally, the various information including priority and other classification information can be provided with the item in various suitable manners. In this respect, the priority and/or classification information can, for example, be provided in a header of the information being routed.

Further, the format of the information can be provided in various manners. For example, in some embodiments, the priority information can be in the form of a one, two, or three bit value that is associated with the information (e.g., provided in the header of the packet, etc). In such embodiments, the priority information then travels with the item as the item is routed through the computing device. This priority information can, in some embodiments, travel with an item through a queue structure.

With regard to the embodiment illustrated in FIG. 1, once the item has been classified, the classified item is routed to a queue 108 where it is held until it can be routed to a forwarding resource 110 for forwarding to a processor or other destination. In the embodiment shown in FIG. 1, items can be routed through parallel paths from source 1 through source M. However, the embodiments of the present invention are not so limited.

For example, other routing structures include, but are not limited to, a single path for use by a number of sources from source 1 through source M can be provided in some embodiments. In various embodiments, paths can be defined for each, or a number of, item protocol types. In this way, the items can be separated and can, in some cases, be classified and prioritized based upon the path on which the item is routed.

As mentioned above, the prioritization of the items can be useful in managing the item traffic at the queue, such as when an item is to be enqueued or dequeued from queue 108. In such embodiments, the prioritization can be used to determine which items are to be discarded prior to or during the enqueueing and/or dequeueing processes.

Figure 2:
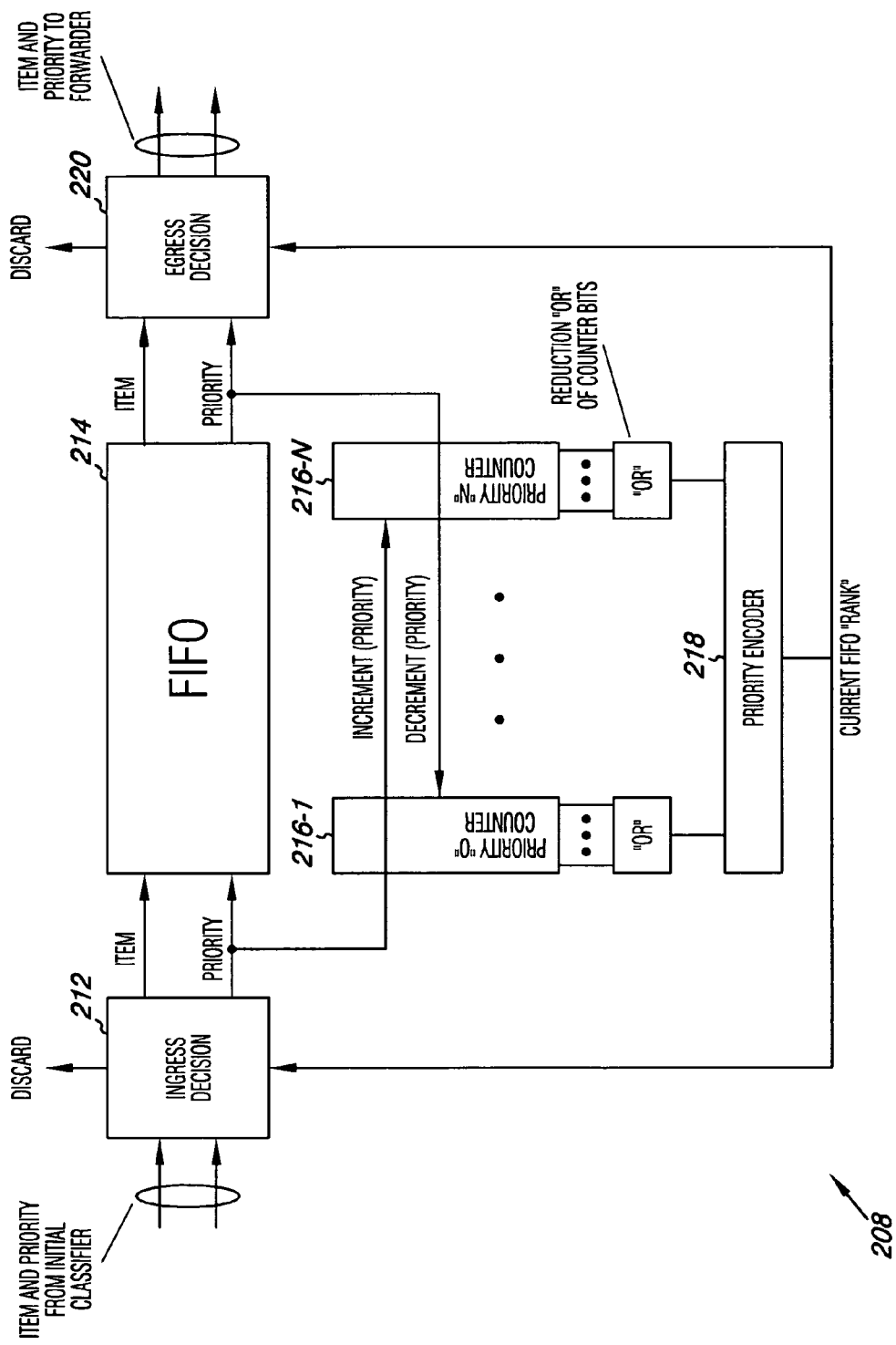
FIG. 2 illustrates an embodiment of an information processing structure.

FIG. 2 illustrates an embodiment of an item processing structure 208. The embodiment of FIG. 2 could, for example, be used as a priority aware queue 108, described in FIG. 1.

In the embodiment of FIG. 2, the items (packets), including their priority information, are routed from an initial classifier (e.g., initial classification 106 of FIG. 1) and into a queue. In this embodiment, the queue is generally described as a First-In First-Out (FIFO) queue structure 214, although, the embodiments of the present invention are not so limited. As discussed briefly above, in such queue structures, each item waits in the queue until it is to be routed to a forwarder for forwarding to its destination.

A FIFO queue structure places the items received in the queue in the order they are received. When removing an item, a FIFO structure takes the longest waiting item (the first item into the queue that has not yet been removed). FIFO structures generally weight items the same with respect to which item is next to be removed from the queue.

In this respect, no item in the queue is more important than another item and therefore, the first item in is the item that is to be removed, even if a higher priority item is in the queue that should be acted upon first. In such queue structures, high priority items often wait behind low priority items until the low priority items have been removed.

Additionally, such queue structures can be designed to discard items when the queue is full and, since each item is treated the same as another, in some situations, high priority items can be discarded when a lower priority item, such as a loss tolerant item, can be discarded instead. Embodiments of the present invention can be used to provide weighting of each item which can be used to reduce the number of situations in which a high priority item will be discarded.

For example, embodiments of the present invention, such as the embodiment shown in FIG. 2, can include a number of additional components to assist the computing device in prioritizing the routing of its items. Through use of these additional components, the information entering the queue and/or exiting the queue can be discarded to make the queue run more efficiently with respect to items having a selected priority or level of priority.

Among the components provided in the embodiment of FIG. 2 is a counter structure having a number of counters 216-1 . . . 216-N. The counters can be used to monitor the number of items waiting in a queue. Various suitable types of counter structures can be used in the various embodiments of the present invention.

For example, in the embodiment illustrated in FIG. 2, the counter structure includes a counter for each level of priority (0 to N levels of priority). In various embodiments, the counters can be designed to include a number of counters based upon type of protocol, type of service provided, or other such suitable classifications.

The information provided by the counter structure can be used for a number of different functions with respect to the queue structures. For example, in some embodiments, a counter can be used to indicate the level of space available within the queue. In some such embodiments, when the counter reaches one or more thresholds, the computing device can begin to select items to discard.

In some embodiments, the initiation of a discard process can be triggered by the queue reaching a threshold. This queue capacity indicator can be provided by one or more pointers set with respect to the queue. The threshold can also be provided, by one or more queue threshold indicators provided by monitoring the number of items in the queue and/or the space available in the queue.

As stated above, the discard process can, for example, be accomplished before items are queued and/or as the items are selected for routing to the forwarder. In such embodiments, the discard process can be based on various suitable types of criteria. For example, the discard process can be based upon priority information or other classification information. An example of a discard process is described in more detail below.

In some embodiments, the counter structure, and in some cases each of the counters within the counter structure, can be reviewed before an item is enqueued or dequeued to/from the queue. In this way, thresholds for enqueuing and dequeuing of items can be actively determined and changed if desired.

In the embodiment shown in FIG. 2, a component is used to determine whether an item should enter the queue or be discarded. In this embodiment, when an item (i.e., packet) is routed from the initial classifier, the item can be evaluated and a decision can be made (e.g., ingress decision 212) as to whether the item should be discarded or routed into the queue.

If it is determined that the item should be routed to the queue, at least one of the counters in the counter structure can be incremented to indicate the entry of an item into the queue. If a single counter is used, the number of waiting items can be determined based upon a value provided by the counter. If multiple counters are provided, such as for different types of items, then a counter associated with a priority, corresponding to the priority of the item, for example, can be incremented. In this way, the number of items of each classification, such as priority, can be monitored.

Further, in embodiments where an incoming item is counted in one or more of the counters in a counter structure, when an item in the queue is routed to the forwarder, one or more of the counters in the counter structure can be decremented to indicate the removal of an item from the queue. In this way, if a single counter is used, the number of waiting items can be determined.

If counters are provided for different types of items, such as classifications (e.g., priorities), then a counter associated with a classification, corresponding to the classification of the item, can be decremented. In this way, the computing device can monitor the number of items in the queue and/or can monitor the number of items of each classification that are in the queue.

In some embodiments, these classification (e.g., priority) counters can be summed to determine the total number of items in the queue. In various embodiments, a separate counter can be used to determine the total number of items in the queue.

Further, an "or" reduction function can be provided, in some embodiments, where an indicator is provided to indicate whether there is an item of a particular classification level. Such information can be useful in determining which classification level represents the highest level classified item in the queue, for example. For example, a priority encoder 218 can be provided.

The priority encoder 218 can be used to provide whether an item of a particular priority is present within the queue, which priority levels have items within the queue, and/or the highest priority level represented in the queue, etc. The highest priority level can be deemed a queue rank (e.g., FIFO rank) which can be used as a threshold in reviewing whether incoming items should be allowed to enter the queue.

For instance, the queue rank can create a threshold in which items having a higher priority than the queue rank are allowed to enter and those having a lower priority are discarded. As higher priority items enter the queue, the queue rank can be raised accordingly.

Other uses include determining which classification levels have items in the queue, determining which items to consider for discarding, and/or which items to discard. For example, such information can be used to eliminate items having certain priority levels from consideration regarding whether or not they should be discarded.

Such a feature can reduce discard determination time. For instance, computer executable instructions can be used to exclude the top two classifications of a number of classified items, thereby reducing the total number of items that are to be evaluated for discard.

This information can also be used to determine when the discarding of items is to be initiated. For example, computer executable instructions can be used to designate that when an item from one of the top three classification levels enters the queue, a set of computer executable instructions is to initiate a discard process.

Information regarding the number of items in a queue can be used to gauge how busy and/or full the queue is over a time period or at a particular time. This information can then be used to determine how to handle incoming items (e.g., whether to discard or route the item into the queue). Embodiments using multiple counters can use the information provided by the counters to also be able to manage item traffic flow based upon the classification of the items in and/or entering the queue.

As stated above, in some embodiments, the information can be used to make an ingress decision. For example, the monitoring of the counters can track the fullness of the queue. For instance, a threshold value for the amount of space available in the queue can be determined and once that threshold has been reached, ingress decisions about what items can enter the queue can be made.

In embodiments having a queue volume indicator, once the queue has emptied below the threshold, in some embodiments, the computing device can allow items of lower priorities to be routed into the queue again. The determination of which items are allowed to be enqueued can be accomplished in various suitable manners.

Those of ordinary skill in the art will understand from reading the present disclosure that embodiments of the present invention can have a number of thresholds and that the various thresholds can be used to limit items of various classification levels as the queue becomes increasingly full. Such thresholds can also be used to increase the number of items that can enter the queue as the queue begins to empty.

In some embodiments, such as that shown in FIG. 2, an egress decision 220 can also be used to discard items prior to forwarding them to the forwarding resources. For example, a number of thresholds for defining the fullness of the queue can also be used to determine when to initiate the use of the egress decision structure. Upon the queue reaching a threshold, the computing device can discard items that have a lower priority than the highest priority in the queue thereby more quickly emptying the queue and more quickly routing the highest priority items.

In various embodiments, such ingress and/or the egress decision making structures can be used. Such ingress and egress structures can be implemented by a set of computer executable instructions, for example.

The decision regarding what items are discarded can be accomplished in various manners. For example, in such embodiments, items having a lower priority than the highest priority currently in the queue can be discarded before they are to enter the queue. In this way, the queue can continue to process the already queued items, but will not take on any new items that are of lower priorities than the highest priority item in the queue.

This also allows the high priority items to be cleared from the queue more quickly. Such a structure also allows high priority items to be enqueued while lower priority items are discarded, thereby moving the higher priority items through the queue faster.

In some embodiments, the discard process can be used to determine whether to discard the item at the head of the queue (i.e., the next item to be processed from the queue (first in)). In such embodiments, the priority of an item coming into the queue can be compared to the priority level of the item at the head of the queue. If the incoming item has a higher priority than the head of the queue, then the head of the queue item can be discarded.

In various embodiments, each item can be provided with item age information. When determining which items to discard, the item age information can be used in the determination. Item age information can, for example, provide information about the length of time an item has been in a queue; the time since an item was created, sent, or classified; a time stamp that indicates a particular time in which the item was created, sent, or classified; among other such time related information. The exemplary discard methods provided above can be used independently or in combination and can be implemented at various points along the routing path and/or in the queue structure.

For instance, the discarding of items can be designed to take a number of different factors into account. For example, in some embodiments, priority information regarding the speed with which an item is to be acted upon can be combined with other classification information, such as a separate classification for loss intolerant versus loss tolerant information formats, to further determine which items are to be discard.

FIG. 3 illustrates an example of information that can be provided by a counter structure of an embodiment of the present invention. The information shown in FIG. 3 of can be obtained from various counter structures including the counter structure provided in the embodiment shown in FIG. 2.

In the embodiment shown in FIG. 3, the information that can be used includes a number of priority levels 330, the highest priority level 338, the lowest priority level 340, and/or other priority levels. This information can be used for a variety of functions. For example, priority levels can be used for setting thresholds and for determining the number of thresholds to be implemented, among other things. A particular priority level can, for example, be used to create a filter for allowing items having the same or higher priority than the particular priority selected.

The information provided in the example also includes the number of items in the queue that have a particular priority level 332, the number of items in the queue having the lowest priority level 316-1, the number of items in the queue having the highest priority level 316-N, and/or the number of items having another particular priority level. This information can also be used for a number of functions.

For example, the information can be used in real time to monitor the number of items in the queue, to determine whether there are items that can be discarded, such as loss tolerant items, and/or for determining at what level to set active threshold levels. For instance, in the information provided in FIG. 3, there are a large number of level 5 priority items. If the threshold were set below level 5, the threshold structure may not reduce the size of the queue as quickly as desired.

This information can also be monitored as items enter and/or leave the queue in order to determine the routing path traffic volume. This can be accomplished by periodically tallying the number of items in the queue or by actively monitoring the incoming and/or outgoing items, among other suitable methods. This information can be provided, for example, in the form of a routing path traffic volume indicator. The indicator can be in the form of a numerical indicator of the number of items in the queue, entering the queue, or leaving the queue over a period of time, for example. The indicator can also indicate a volume level, such as high, medium or low.

The example of FIG. 3 also includes information regarding whether the queue includes items having a particular priority level 334. This information can be used for a variety of purposes. For example, the information can be used to determine a rank for the queue, such that when items are being enqueued, no items having a priority lower than the queue rank are allowed to enter the queue.

This information can also be used for determining other thresholds for determining which items are to be discarded. The information can also be used to identify what counters are active and which should be monitored. In this way, if no items of a particular priority level are in the queue, the computer executable instructions monitoring the counter structure can continue to monitor the active counters, thereby reducing the number of counter that have to be reviewed.

In FIG. 3, the information provided also includes a count indicator indicating the total number of items in the queue and the queue capacity indicator that indicates the space available in the queue 336. As with the other information discussed above, this information can be used for a variety of purposes. For example, the space available can be used to determine when to initiate the use of a discard process and can be used to determine the threshold level and in some cases the number of thresholds to be used in a discard process.

Although the example of FIG. 3 includes a variety of information that can be obtained, these types of information are not an exhaustive list and accordingly, there may be various other types of information that can be obtained from such counting structures, that can be used by various embodiments of the invention, and various other uses for information than those discussed above.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device having a priority aware queue, the device comprising:
    a queue having a plurality of counters associated therewith to monitor a number of items in the queue, each of the plurality of counters having a priority-based classification level associated with a classification level of each of the items; and
    a logic component to review a classification level of an incoming item to determine whether to discard the incoming item based upon whether at least one of the counters indicates that a higher classification item is being held in the queue,
    wherein the logic component includes a priority encoder to review each of the plurality of counters to determine the highest classification item being held in the queue.

2. The computing device of claim 1, wherein the logic component includes an ingress decision logic component that reviews the classification level of the incoming item to determine whether to discard the incoming item prior to the incoming item entering the queue.

3. The computing device of claim 1, wherein the priority encoder reviews each of the plurality of counters after removal of each item from the queue.

4. The computing device of claim 1, wherein the logic component reviews each of the number of items based upon a comparison of item age information associated with one item versus item age information associated with another item.

5. The computing device of claim 1, wherein the logic component further provides an OR reduction function that indicates how many items of a particular priority level are in a queue.

6. The computing device of claim 1, wherein the logic component provides a counter for each classification level.

7. A computing system, comprising:
    a number of routing paths for routing a number of items each having a priority-based classification level associated therewith;
    a number of queues associated with the number of routing paths for holding the number of items;
    a plurality of counters associated with each queue to monitor the number of items; and
    means associated with each queue for reviewing each of the number of items to determine whether to discard the item based upon a comparison of the classification associated with the item and a highest classification item in the queue,
    wherein the means include a priority encoder to review each of the plurality of counters to determine the highest classification item in the queue.

8. The computing system of claim 7, wherein the means for reviewing each of the number of items includes defining a current queue rank and comparing the rank to the classification of an item to determine whether to discard the item.

9. The computing system of claim 7, wherein the determination of whether to discard the item is also based upon a queue capacity indicator.

10. The computing system of claim 7, wherein the determination of whether to discard the item is based upon a queue capacity reaching a threshold level.

11. The computing system of claim 10, wherein the determination of whether to discard the item is also based upon a routing path traffic volume indicator.

12. The computing system of claim 10, wherein the means for reviewing each of the number of items to determine whether to discard the item includes means for comparing the classification associated with a incoming item with the classification of an item at the head of the queue to determine if either should be discarded.

13. A method for managing items on a network device, comprising:
    counting a number of items associated with a queue wherein the counts are organized into levels of priority-based classification and stored in one of a plurality of counters; and
    reviewing each of the number of items to determine whether to discard the item based upon a comparison of the classification associated with the item to be discarded and a highest classification item being held in the queue,
    wherein the highest classification item being held in the queue is determined by a priority encoder that reviews each of the plurality of counters.

14. The method of claim 13, wherein counting the number of items includes incrementing a counter associated with a particular classification upon receipt of an item of a corresponding classification level.

15. The method of claim 13, wherein counting the number of items includes decrementing a counter associated with a particular priority upon removal of an item of a corresponding priority level from the queue.

16. The method of claim 13, wherein the method further includes monitoring multiple counters associated with multiple priority levels to determine whether there is an item corresponding to one of the multiple priority levels in the queue.

17. The method of claim 13, wherein reviewing each of the number of items includes monitoring at least one priority indicator associated with a highest priority level.

18. A computer readable medium having a program to cause a device to perform a method, comprising:
    counting a number of items associated with a queue wherein the counts are organized into levels of priority-based classification and stored in one of a plurality of counters; and
    reviewing each of the number of items to determine whether to discard the item based upon a comparison of the classification associated with the item to be discarded and a highest classification item being held in the queue,
    wherein the highest classification item being held in the queue is determined by a priority encoder that reviews each of the plurality of counters.

19. The medium of claim 18, wherein the method further includes monitoring the plurality of counters to determine the count indicator.

20. The medium of claim 19, wherein the method further includes restricting the plurality of counters being monitored based upon a routing path traffic volume indicator.

21. The medium of claim 19, wherein the method further includes restricting the plurality of counters being monitored based upon a queue capacity indicator.

22. The medium of claim 19, wherein the method further includes restricting the plurality of counters being monitored by a plurality of active counters.

* * * * *